US012496683B2

(12) United States Patent
Gu et al.

(10) Patent No.: US 12,496,683 B2
(45) Date of Patent: Dec. 16, 2025

(54) DEBURRING CONTROL DEVICE, AND DEBURRING SYSTEM

(71) Applicant: FANUC CORPORATION, Yamanashi (JP)

(72) Inventors: Yihua Gu, Yamanashi (JP); Takashi Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 376 days.

(21) Appl. No.: 18/044,142

(22) PCT Filed: Oct. 4, 2021

(86) PCT No.: PCT/JP2021/036618
§ 371 (c)(1),
(2) Date: Mar. 6, 2023

(87) PCT Pub. No.: WO2022/075257
PCT Pub. Date: Apr. 14, 2022

(65) Prior Publication Data
US 2023/0311271 A1 Oct. 5, 2023

(30) Foreign Application Priority Data

Oct. 9, 2020 (JP) ................................. 2020-170887

(51) Int. Cl.
*B24B 51/00* (2006.01)
*B24B 49/00* (2012.01)
(Continued)

(52) U.S. Cl.
CPC ............ *B24B 51/00* (2013.01); *B24B 49/006* (2013.01); *B24B 49/12* (2013.01); *B24B 49/16* (2013.01)

(58) Field of Classification Search
CPC ....... B24B 51/00; B24B 49/006; B24B 49/12; B24B 49/16; B24B 27/0007;
(Continued)

(56) References Cited

U.S. PATENT DOCUMENTS

| 5,044,125 A * | 9/1991 | Lambert, Jr. ........... B24B 49/16 451/72 |
| 2015/0352716 A1* | 12/2015 | Sonehara ............... B25J 9/1633 901/10 |
| 2017/0341200 A1* | 11/2017 | Ueda ...................... B25J 9/1651 |

FOREIGN PATENT DOCUMENTS

| CN | 105397588 A | 3/2016 |
| CN | 110678727 A | 1/2020 |

(Continued)

OTHER PUBLICATIONS

International Search Report issued in PCT/JP2021/036618; mailed Nov. 30, 2021.

*Primary Examiner* — Joel D Crandall
(74) *Attorney, Agent, or Firm* — Studebaker Brackett PLLC

(57) ABSTRACT

The objective of the present invention is to provide a deburring control device capable of easily identifying the cause of a deburring failure. A deburring control device according to one aspect of the present disclosure controls deburring processing for removing burrs on a workpiece by moving a deburring tool along a ridge line of the workpiece by means of a robot, and is provided with: an offset amount calculating unit for calculating an offset amount between the actual path of the robot and a taught path thereof; a pressing force acquiring unit for acquiring the pressing force of the deburring tool; a rotational speed acquiring unit for acquiring the rotational speed of the deburring tool; a failure detecting unit for detecting a deburring failure, in which the deburring processing could not be performed appropriately, (Continued)

on the basis of the offset amount, the pressing force, and the rotational speed; and a recording unit for recording a failure reason, which is the reason for the failure detecting unit determining the deburring failure, when the deburring failure is detected.

8 Claims, 3 Drawing Sheets

(51) Int. Cl.
*B24B 49/12* (2006.01)
*B24B 49/16* (2006.01)

(58) Field of Classification Search
CPC .............. B24B 27/0015; B24B 27/003; B24B 27/0038; B24B 47/22
See application file for complete search history.

(56) References Cited

FOREIGN PATENT DOCUMENTS

| | | |
|---|---|---|
| DE | 10 2012 021 374 B4 | 2/2016 |
| DE | 10 2014 108 956 B4 | 12/2016 |
| DE | 10 2017 128 757 A1 | 6/2018 |
| DE | 10 2016 121 058 B4 | 1/2020 |
| EP | 2 091 700 B1 | 2/2024 |
| JP | H04-280303 A | 10/1992 |
| JP | H08-118276 A | 5/1996 |
| JP | H09-011079 A | 1/1997 |
| JP | 2001-096446 A | 4/2001 |
| JP | 2004-122846 A | 4/2004 |

* cited by examiner

DEBURRING CONTROL DEVICE, AND DEBURRING SYSTEM

TECHNICAL FIELD

The present invention relates to a deburring control device and a deburring system

BACKGROUND ART

There is known a system in which a robot moves a tool along a ridge line of a workpiece, thereby performing a deburring process on the workpiece. In such a system, the deburring process may not be normally performed for some reason.

As a means for addressing the above case, a technique is known according to which an overload of a deburring tool is detected using a force-torque sensor or the like attached to a robot, and the movement of the deburring tool is stopped in the event of the overload. Furthermore, it has been proposed to retract, following the stop of the deburring tool, the deburring tool in a direction in which the overload is reduced, (see, for example, Patent Document 1).

Patent Document 1: Japanese Unexamined Patent Application, Publication No. H09-11079

DISCLOSURE OF THE INVENTION

Problems to be Solved by the Invention

A deburring defect may be caused in various situations, such as when a deburring tool cannot be accurately moved along the workpiece and when chatter vibration occurs in the deburring tool. Therefore, in a case where a system automatically interrupts a deburring process and retracts a deburring tool, the cause of the overload cannot be identified, making it less easy to restart the deburring process. Therefore, it is desirable to facilitate identification of the cause of a deburring defect.

Means for Solving the Problems

An aspect of the present disclosure is directed to a deburring control device for controlling a deburring process for deburring a workpiece by causing a robot to move a deburring tool along a ridge line of the workpiece. The deburring control device includes: a displacement amount calculation unit configured to calculate an amount of displacement of an actual trajectory of the robot from a taught trajectory; a pressing force acquisition unit configured to acquire a pressing force that the deburring tool applies; a rotation speed acquisition unit configured to acquire a rotation speed of the deburring tool; a defect detection unit configured to detect a deburring defect resulting from failure to appropriately perform the deburring process, based on the amount of displacement, the pressing force, and the rotation speed; a recording unit configured to record, in response to detection of the deburring defect, a reason for defect for which the defect detection unit has determined that the deburring defect has been caused.

Effects of the Invention

A deburring control device according to an aspect of the present disclosure and a deburring system according to an aspect of the present disclosure make it easy to identify the cause of a deburring defect.

PREFERRED MODE FOR CARRYING OUT THE INVENTION

Figure 1:
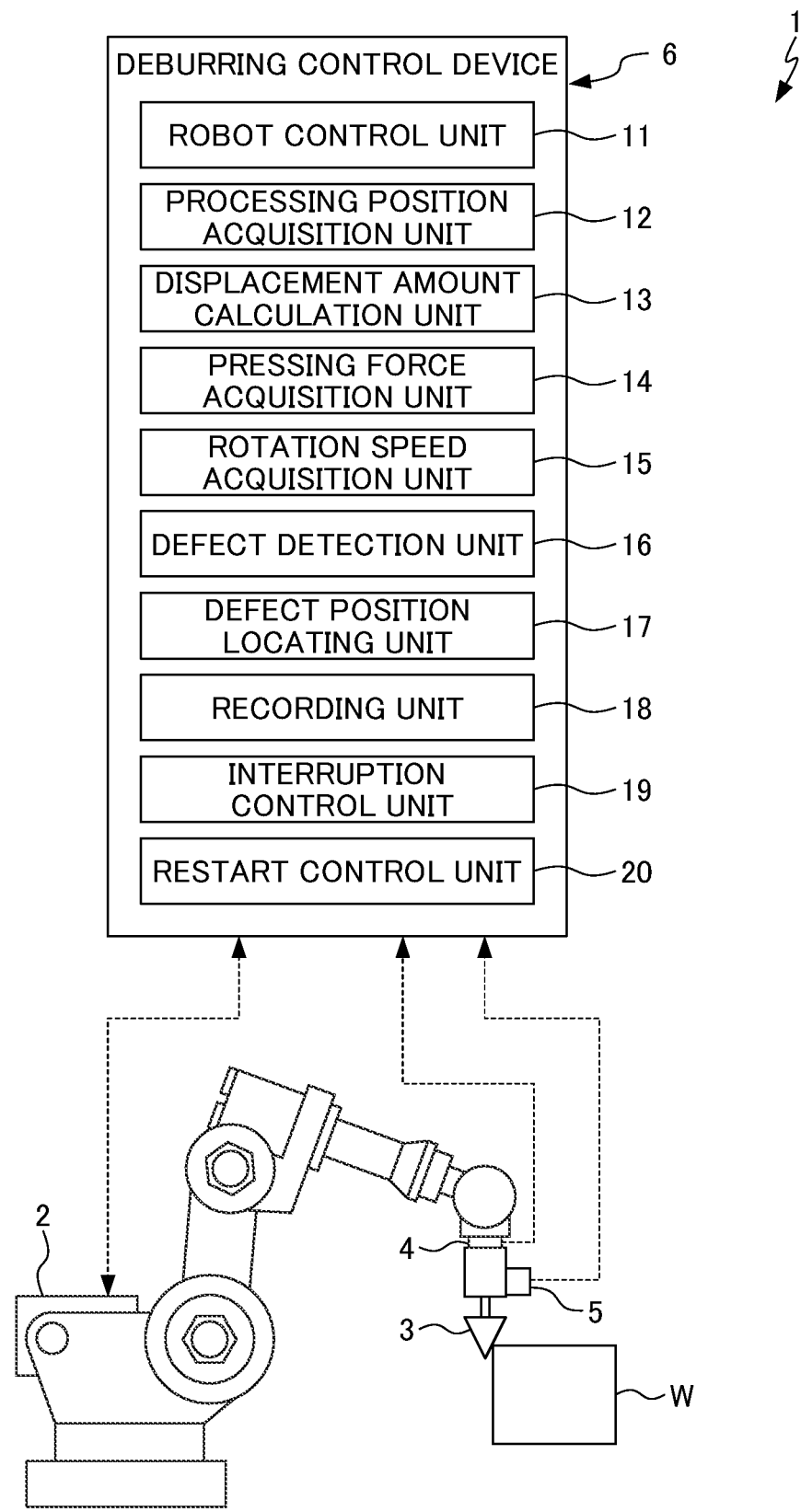
FIG. 1 is a schematic diagram illustrating a configuration of a deburring system according to an embodiment of the present disclosure.

Embodiments of the present disclosure will be described with reference to the drawings. FIG. 1 is a schematic diagram illustrating a configuration of a deburring system 1 according to an embodiment of the present disclosure. The deburring system 1 is configured to deburr a workpiece W.

The deburring system 1 of the present embodiment includes a robot 2, a deburring tool 3 held at a distal end of the robot 2, a force-torque sensor 4 interposed between the robot 2 and the deburring tool 3, a rotation speed detector 5 for detecting a rotation speed of the deburring tool 3, and a deburring control device 6 for controlling the robot 2.

Typically, a vertical articulated robot is employed as the robot 2, but examples of the robot 2 include a scalar robot, a parallel link robot, an orthogonal coordinate robot, etc.

As the deburring tool 3, a grinder or a reamer can be used, for example. The shape of the deburring tool 3 may be appropriately selected from a circular column shape, a conical shape, etc.

The force-torque sensor 4 measures force and torque along three axes. In other words, the force-torque sensor 4 is capable of detecting a force acting on the deburring tool 3 as a three-dimensional vector. Use of this force-torque sensor 4 makes it possible to accurately check forces in various directions acting on the deburring tool 3.

As the rotation speed detector 5, a rotary encoder or the like may be used which is disposed on a rotary shaft of the deburring tool 3, a rotary shaft of a drive system for driving the deburring tool 3, etc.

The deburring control device 6 controls a deburring process for deburring the workpiece W by causing the robot 2 to move the deburring tool 3 along a ridge line of the workpiece W. The deburring control device 6 according to the present embodiment includes a robot control unit 11, a processing position acquisition unit 12, a displacement amount calculation unit 13, a pressing force acquisition unit 14, a rotation speed acquisition unit 15, a defect detection unit 16, a defect position locating unit 17, a recording unit 18, an interruption control unit 19, and a restart control unit 20.

The deburring control device 6 can be implemented by loading an appropriate control program to one or more computer devices that include a CPU, a memory, and the like. The above-described components of the deburring control device 6 correspond to classification of the functions of the deburring control device 6, and do not have to be clearly distinguishable from each other in terms of physical structure and program structure. The deburring control device 6 may include further components that carry out other functions.

The robot control unit 11 operates the robot in accordance with teaching data to thereby move the deburring tool 3 along a ridge line of the workpiece W.

The processing position acquisition unit 12 acquires an actual position of the deburring tool 3 every certain period, i.e., data of an actual trajectory of the deburring tool 3. The position of the deburring tool 3 can be calculated based on feedback data indicating an actual position of a drive shaft of the robot 2.

The displacement amount calculation unit 13 calculates an amount of displacement of the actual trajectory of the robot 2 from a taught trajectory. For example, the displacement amount calculation unit 13 may be configured to calculate, every certain period, a separation distance between a position of the deburring tool 3 according to the teaching data for the robot 2 and an actual position of the deburring tool 3 acquired by the processing position acquisition unit 12.

The pressing force acquisition unit 14 acquires a pressing force that the deburring tool 3 applies to the workpiece W. The pressing force acquired by the pressing force acquisition unit 14 is preferably vector data including information regarding a direction. For example, the pressing force acquisition unit 14 may be configured to acquire the pressing force of the deburring tool 3 from the force-torque sensor 4 provided to the robot 2. Alternatively, the pressing force acquisition unit 14 may be configured to acquire the pressing force of the deburring tool 3 from another detection means such as a distortion sensor.

The rotation speed acquisition unit 15 may be configured to acquire a rotation speed of the deburring tool 3 from the rotation speed detector 5.

The defect detection unit 16 detects a deburring defect resulting from failure to appropriately perform the deburring process, based on an amount of displacement determined by the displacement amount calculation unit 13, a pressing force acquired by the pressing force acquisition unit 14, and a rotation speed acquired by the rotation speed acquisition unit 15. The defect detection unit 16 may be configured to monitor a change in the amount of displacement, a change in the pressing force, and a change in the rotation speed, and determine that a deburring defect has been caused when any one of the amount of displacement, the pressing force, and the rotation speed deviates from a predetermined proper range. Employing this determination method makes it possible to relatively accurately detect a deburring defect.

Specifically, for example, the defect detection unit 16 may be configured to determine that a deburring defect has been caused when the amount of displacement (D) is greater than a preset threshold value (Dmax) (D>Dmax). This is because the deburring tool 3 is prevented from deburring the workpiece W when separated from the workpiece W, and the deburring tool 3 excessively shaves the workpiece W when biting the workpiece W.

Figure 2:
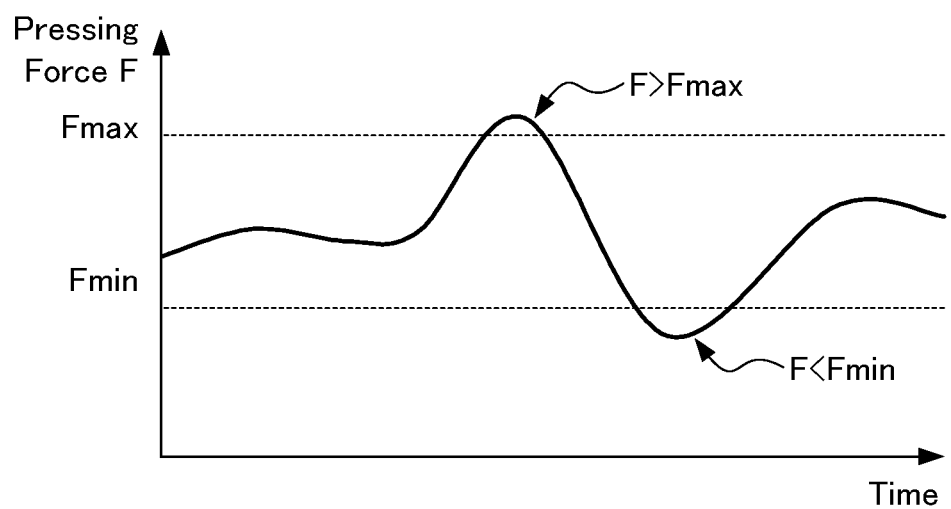
FIG. 2 is a graph for schematically illustrating one aspect of detection of a deburring defect by the deburring control device of FIG. 1.

FIG. 2 illustrates, as an example, a change in the pressing force F of the deburring tool 3. The defect detection unit 16 may be configured to determine that a deburring defect has been caused when the pressing force F is greater than a preset upper limit value Fmax (F>Fmax). This is because when pressed against the workpiece W too strongly, the deburring tool 3 excessively shaves the workpiece W. The defect detection unit 16 may be configured to determine that a deburring defect has been caused when the pressing force F is less than a predetermined lower limit value Fmin (F<Fmin). This is because when pressed against the workpiece W with an insufficient force, the deburring tool 3 is prevented from completely deburring the workpiece W.

Figure 3:
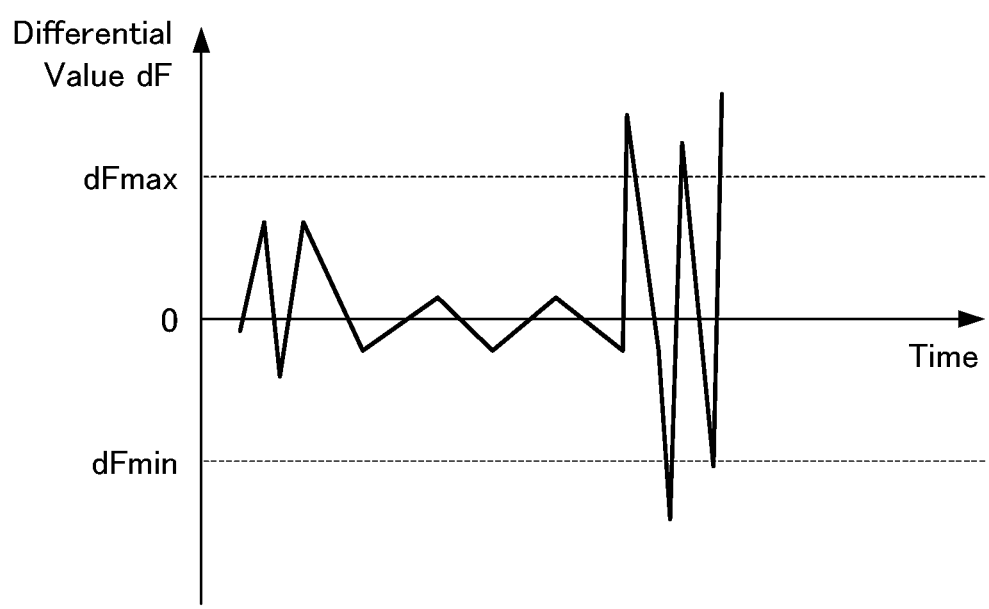
FIG. 3 is a graph for illustrating another aspect of detection of a deburring defect by the deburring control device of FIG. 1.

FIG. 3 illustrates, as an example, a change in a differential value dF of the pressing force F of the deburring tool 3 (an amount of change in the pressing force within a unit time). The defect detection unit 16 may be configured to determine that a deburring defect has been caused when the differential value dF of the pressing force F has an absolute value greater than a predetermined positive maximum value dFmax (dF>dFmax), and when the differential value dF of the pressing force F has an absolute value less than a predetermined negative minimum value dFmin (dF<dFmin). This is because it is considered that an abnormal vibration is occurring in the deburring tool 3 when the differential value dF of the pressing force F has an excessively large absolute value. For simplification, the maximum value dFmax and the minimum value dFmin may be set to have an equal absolute value, and the defect detection unit 16 may be configured to determine that a deburring defect has been caused when the absolute value of the differential value dF of the pressing force F is greater than the preset maximum value dFmax (i.e., |dF|>dFmax).

Figure 4:
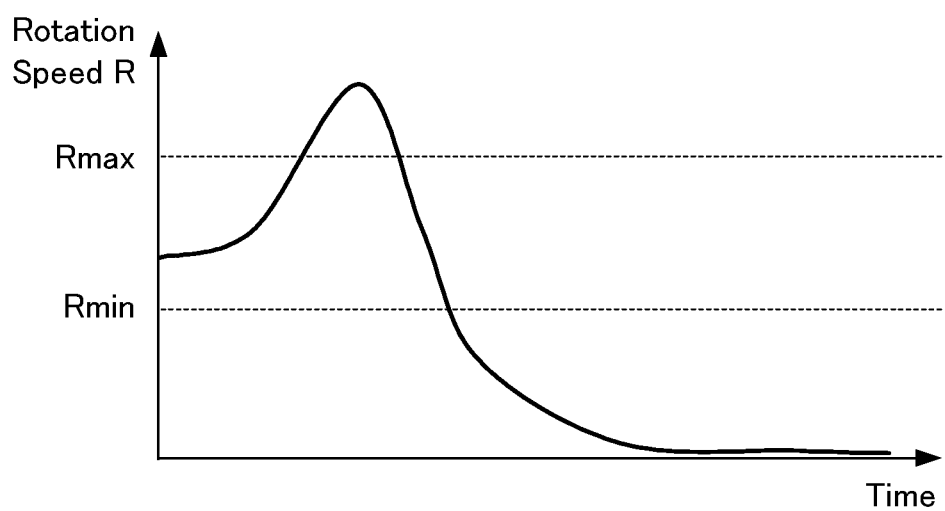
FIG. 4 is a graph for illustrating yet another aspect of detection of a deburring defect by the deburring control device of FIG. 1.

FIG. 4 illustrates, as an example, a change in a rotation speed R of the deburring tool 3. The defect detection unit 16 may be configured to determine that a deburring defect has been caused when the rotation speed R is greater than a preset maximum value Rmax (R>Rmax). This is because the deburring tool 3 excessively shaves the workpiece W when the rotation speed R of the deburring tool 3 is too high. The defect detection unit 16 may be configured to determine that a deburring defect has been caused when the rotation speed R is less than a preset minimum value Rmin (R<Rmin). This is because the decrease in the rotation speed R of the deburring tool 3 is caused by an overload. The minimum value Rmin may be set to 0.

The defect position locating unit 17 locates a defect position where a deburring defect has been caused. For example, the defect position locating unit 17 may be configured to determine, from among actual positions of the deburring tool 3 acquired by the processing position acquisition unit 12, one position at which the deburring tool 3 was at the time of acquisition of the amount of displacement, the pressing force, or the rotation speed that has been determined to indicate a deburring defect by the defect detection unit 16, to be the defect position.

Alternatively, the defect position locating unit 17 may be configured to locate a defect position based on image information acquired from a visual sensor that captures an image of the workpiece W. That is, the deburring system 1 may include the visual sensor (not shown). Specifically, the defect position locating unit 17 may calculate a machining depth that is a distance between a contour of the workpiece W before being subjected the deburring process and the contour of the workpiece W subjected to the deburring process, and determine a position where the machining depth is less than a preset minimum value to be a "defect position where the deburring process has not been performed sufficiently", and determine a position where the machining depth is greater than a preset maximum value to be a "defect position where the workpiece W has been shaved excessively".

The recording unit 18 records, in response to detection of a deburring defect, the reason for defect for which the defect detection unit 16 has determined that the deburring defect has been caused. Accordingly, the defect detection unit 16 may be configured to record information specifying how and which of the amount of displacement, the pressing force, or the rotation speed has deviated from the respective proper range. Specifically, for example, the reason for defect may be any one of an excess of the amount of displacement, an excess of the pressing force, a shortfall of the pressing force, an excess of the differential value of the pressing force, a shortfall of the differential value of the pressing force, an excess of the rotation speed, and a shortfall of the rotation speed. The recording unit 18 can record these reasons for defect using codes or flags or the like corresponding to them on a one-to-one basis.

The recording unit 18 may record, in response to detection of a deburring defect, a value of any one of the amount of displacement, the pressing force, and the rotation speed that has been determined to indicate the deburring defect by the defect detection unit 16. This configuration allows estimation of a degree of the deburring defect based on the value of the amount of displacement, the value of the pressing force, and the value of the rotation speed, making it easy to develop a solution to the deburring defect.

Further, the recording unit 18 may record the defect position located by the defect position locating unit 17, preferably in association with the cause of the defect and time series data of any one of the amount of displacement, the pressing force, and the rotation speed, which has been determined to indicate the deburring defect. This configuration makes it possible to more accurately determine the cause of the deburring defect.

The interruption control unit 19 interrupts the deburring process and retracts the deburring tool 3, in response to detection of a deburring defect. In order to eliminate the situation in which the deburring defect is caused as soon as possible, the interruption control unit 19 preferably retracts the deburring tool 3 linearly in a direction in which the pressing force acts. Nevertheless, the interruption control unit 19 may retract the deburring tool 3 in a direction orthogonal to a machined surface or in a normal direction of the workpiece W. A distance by which the deburring tool 3 is to be retracted may be preset.

After the interruption of the deburring process, the restart control unit 20 restarts the deburring process from the defect position. Specifically, the restart control unit 20 may be configured to acquire the defect position from the recording unit 18, and restart the deburring process from a position that is on the taught trajectory and is closest to the defect position. This configuration makes it possible to prevent a normally-deburred portion of the workpiece W from being shaved excessively by being subjected again to the deburring process.

The deburring system 1, which is configured as described above and includes the defect detection unit 16 and the recording unit 18, can facilitate identification of the cause of a deburring defect. Therefore, the deburring system 1 can appropriately deburr the workpiece W.

In the event of a deburring defect, the deburring system 1, which includes the defect position locating unit 17, allows a user to check the position of the deburring defect, whereby the user can easily confirm whether or not the reason for defect recorded in the recording unit 18 is correct. Further, due to the defect position locating unit 17 provided therein, the deburring system 1 can appropriately restart the deburring process after the deburring defect has been caused.

Due to the interruption control unit 19 provided therein, the deburring system 1 can minimize damage to the workpiece W and damage to the deburring tool 3 in the event of a deburring defect.

While one embodiment of the deburring system according to the present disclosure has been described above, the scope of the present disclosure is not limited to the above-described embodiment. The effects described in the above embodiment are merely the most preferred effects exerted by the deburring system according to the present disclosure, and the effects of the deburring system according to the present disclosure are not limited to those described in the above-described embodiment.

For example, for the deburring control device according to the present disclosure, the defect position locating unit, the interruption control unit, and the restart control unit are non-essential components.

EXPLANATION OF REFERENCE NUMERALS

1: Deburring system
2: Robot
3: Deburring tool
4: Force-torque sensor
5: Rotation speed detector
6: Deburring control device
11: Robot control unit
12: Processing position acquisition unit
13: Displacement amount calculation unit
14: Pressing force acquisition unit
15: Rotation speed acquisition unit
16: Defect detection unit
17: Defect position locating unit
18: Recording unit
19: Interruption control unit
20: Restart control unit
W: Workpiece

The invention claimed is:

1. A deburring control device for controlling a deburring process for deburring a workpiece by causing a robot to move a deburring tool along a ridge line of the workpiece, the deburring control device comprising:
   a displacement amount calculation unit configured to calculate an amount of displacement of an actual trajectory of the robot from a taught trajectory;
   a pressing force acquisition unit configured to acquire a pressing force that the deburring tool applies;
   a rotation speed acquisition unit configured to acquire a rotation speed of the deburring tool;
   a defect detection unit configured to detect a deburring defect resulting from failure to appropriately perform the deburring process, in all cases of an excess of the amount of displacement, an excess of the pressing force, a shortfall of the pressing force, an excess of a differential value of the pressing force, a shortfall of the differential value of the pressing force, an excess of the rotation speed, and a shortfall of the rotation speed; and
   a recording unit configured to record, in response to detection of the deburring defect, a reason of a detection of the deburring defect by the defect detection unit.

2. The deburring control device according to claim 1, further comprising:
   a defect position locating unit configured to locate a defect position where the deburring defect has been caused, wherein
   the recording unit further records the defect position located by the defect position locating unit.

3. The deburring control device according to claim 2, further comprising:
   a processing position acquisition unit configured to acquire an actual position of the deburring tool, wherein
   the defect position locating unit determines, from among positions of the deburring tool acquired by the processing position acquisition unit, one position at which the deburring tool was at a time of acquisition of the amount of displacement, the pressing force, or the rotation speed that has been determined to indicate the deburring defect by the defect detection unit, to be the defect position.

4. The deburring control device according to claim 2, wherein
the defect position locating unit locates the defect position based on image information acquired from a visual sensor that captures an image of the workpiece.

5. The deburring control device according claim 2, further comprising:
an interruption control unit configured to interrupt the deburring process and retract the deburring tool, in response to detection of the deburring defect; and
a restart control unit configured to restart, after interruption of the deburring process, the deburring process from the defect position.

6. The deburring control device according to claim 1, further comprising:
an interruption control unit configured to interrupt the deburring process and retract the deburring tool, in response to detection of the deburring defect.

7. The deburring control device according to claim 1, wherein
the pressing force acquisition unit acquires the pressing force from a force-torque sensor attached to the robot.

8. A deburring system comprising:
the deburring control device according to claim 1; and
a robot controllable by the deburring control device and configured to move the deburring tool along the ridge line of the workpiece.

\* \* \* \* \*